United States Patent [19]
Idland et al.

[11] Patent Number: 6,066,253
[45] Date of Patent: May 23, 2000

[54] SPA OR POOL WATER FILTERING APPARATUS

[75] Inventors: Carsten H. Idland, Los Angeles; John J. Nelson, Westlake Village, both of Calif.

[73] Assignee: Softub, Inc., Chatsworth, Calif.

[21] Appl. No.: 09/084,405

[22] Filed: May 26, 1998

[51] Int. Cl.[7] .................................................. B01D 35/02
[52] U.S. Cl. .......................... 210/169; 210/232; 210/460; 4/507; 4/292
[58] Field of Search ..................... 210/169, 232, 210/416.2, 460; 4/507, 509, 541.3, 292

[56] References Cited

U.S. PATENT DOCUMENTS

| | | | |
|---|---|---|---|
| 3,263,811 | 8/1966 | Baker et al. | 210/169 |
| 3,348,686 | 10/1967 | Spitzer | 210/169 |
| 3,722,686 | 3/1973 | Arnett et al. | 210/460 |
| 3,940,807 | 3/1976 | Baker et al. | 210/169 |
| 4,359,790 | 11/1982 | Chalberg | 4/541.3 |
| 4,596,656 | 6/1986 | Higginbotham et al. | 210/169 |
| 4,676,894 | 6/1987 | Diamond et al. | 210/416.2 |
| 4,921,600 | 5/1990 | Meissner | 210/169 |
| 5,006,238 | 4/1991 | Tominaga | 210/169 |
| 5,347,664 | 9/1994 | Hamza et al. | 210/416.2 |

*Primary Examiner*—Christopher Upton
*Attorney, Agent, or Firm*—William W. Haefliger

[57] ABSTRACT

A pool or spa filter comprising a filter unit having porous filter wall structure to pass pool or spa water into the filter unit interior, the unit having a suction outlet; a perforated cover plate in water-passing registration with the outlet; the filter unit and cover plate being endwise interconnected and blocked against endwise inadvertent disconnection.

18 Claims, 5 Drawing Sheets

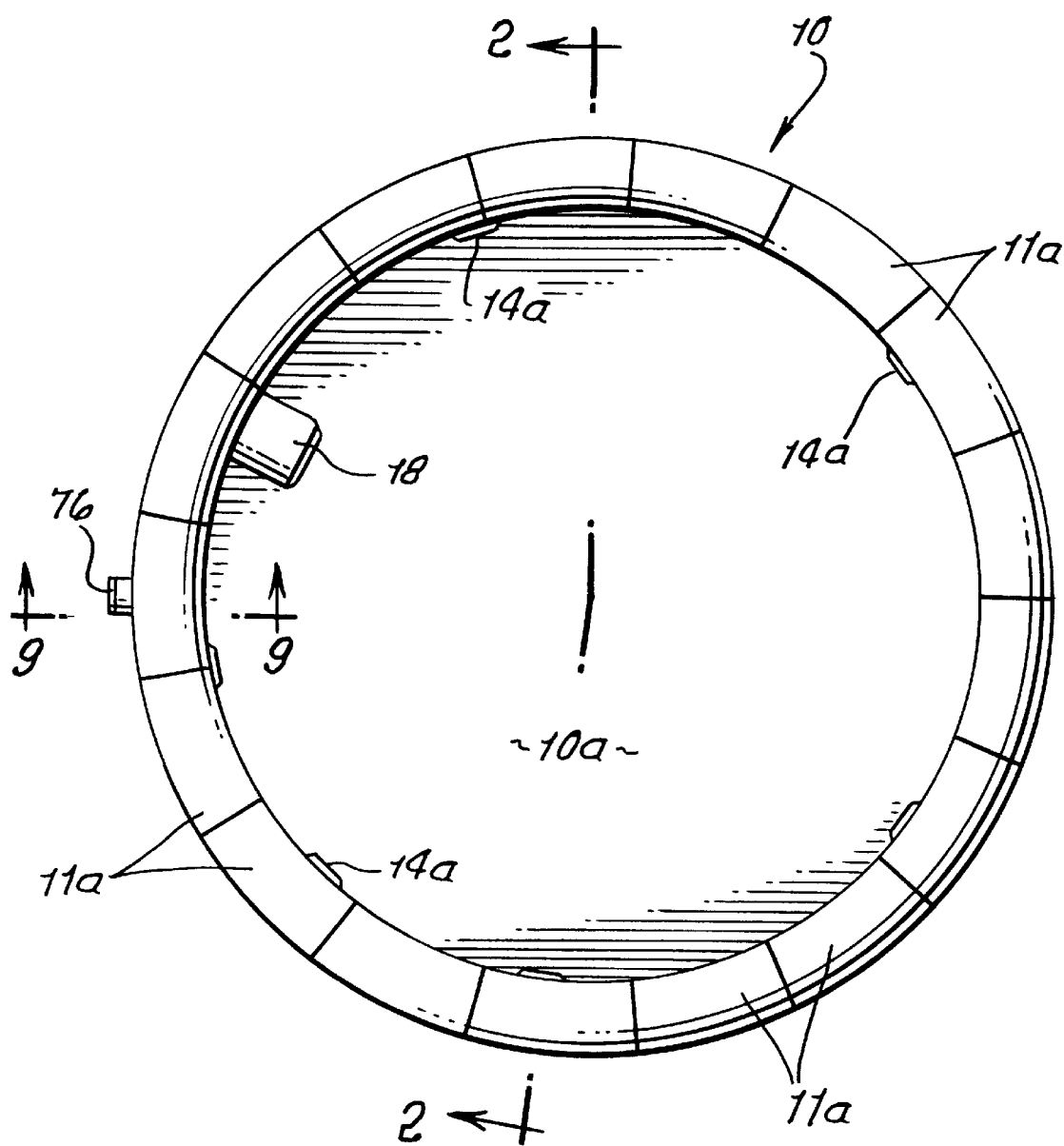

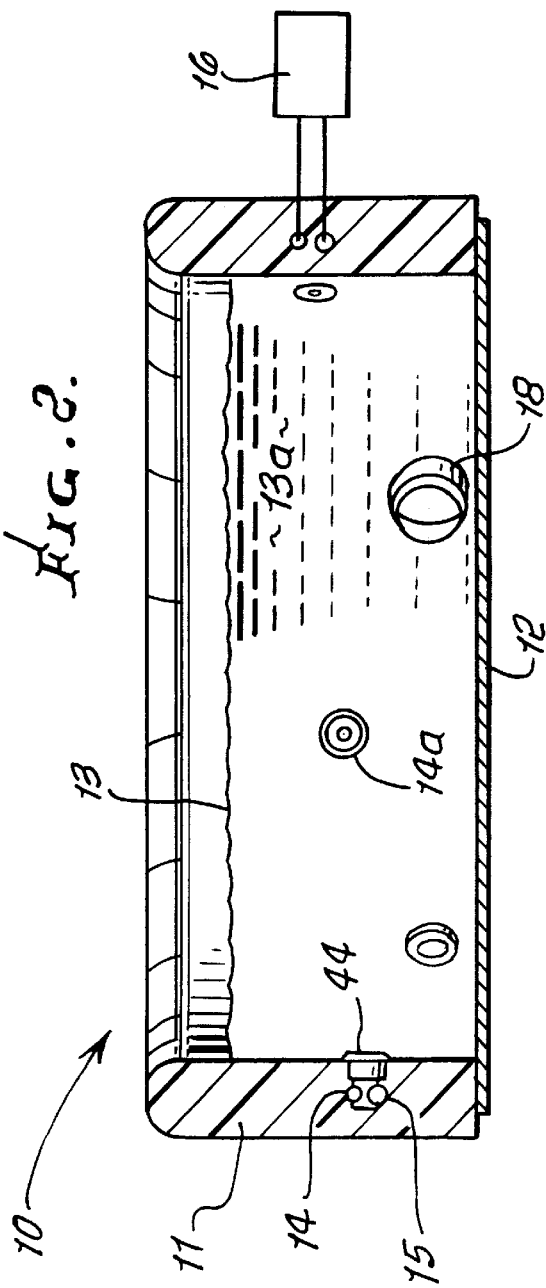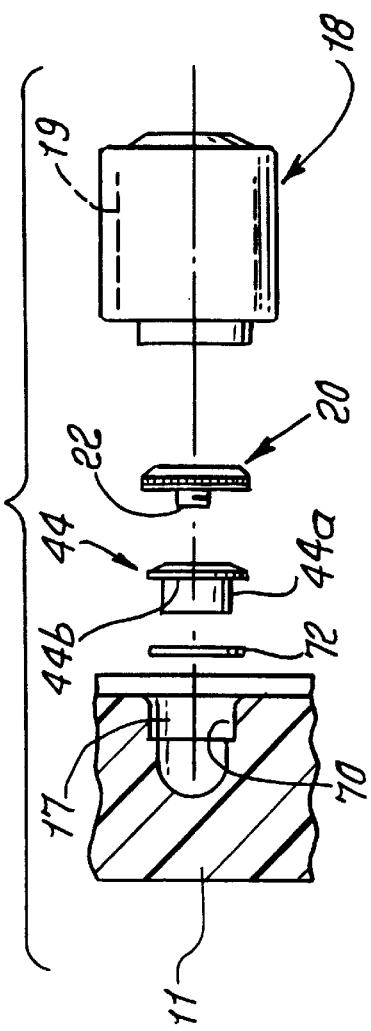

SPA OR POOL WATER FILTERING APPARATUS

BACKGROUND OF THE INVENTION

This invention relates generally to filtering of water in spas or pools; and more specifically, it concerns mounting of filter units in a safe manner to project into spa and pool water contained by the spa or pool body, and in relation to a cover plate at a suction duct inlet in the body wall.

The invention is directed to a solution to the problem of improper suction cover mounting at the inner side of the spa or pool wall. Such improper mounting can lead to dislodgment of the suction outlet cover, and subsequent forcible drawing, as by water suction force, of a part of a bather's anatomy at or into the suction outlet, leading to injury. Accordingly, there is need for an improved and reliable mounting of the suction cover.

SUMMARY OF THE INVENTION

Basically, and as will appear, the filter unit itself is employed to easily endwise captivate the cover plate, so that the two cannot be separated, endwise, i.e., axially.

A major object of the invention is to provide an assembly, which comprises:
a) a filter unit having porous filter wall means to pass pool or spa water into the filter unit interior, the unit having a suction outlet,
b) a perforated cover plate in water passing registration with the outlet,
c) the filter unit and cover plate being endwise interconnected and blocked against endwise inadvertent disconnection.

Another object is to provide an annular flange integral with the filter unit, the plate removably interfitting the flange, endwise. As will be seen, the plate and flange may have endwise push-together detent or snap interconnection. Such releasable interconnection allows for easy removal and replacement of the filter unit. In this regard, the annular flange may advantageously have an inner wall and an internal lip, the plate received against the inner wall and against the internal lip.

A further object is to provide the flange to have a cylindrical inner wall, the plate having a cylindrical outer wall fitting radially against the flange inner wall.

Yet another object is to provide a cover plate having a circularly extending peripheral portion, and to provide a flange interior lip having a generally circularly extending portion engaging the plate circular peripheral portion.

An additional object is to provide the filter unit to have a first axis, the flange extending eccentrically relative to the filter unit axis, the filter unit having a non-metallic filtering element extending cylindrically about the first axis.

As will be seen, the filter may have a first axis, and the cover plate has a second axis, the second axis located eccentrically relative to the first axis.

A yet further object is to provide the filter unit to have a perforate tube in the unit interior, to receive pool or spa water after its passage through the filter element, and to pass such water endwise to the cover plate connected to the filter unit in coaxial relation to the perforate tube.

In one embodiment, a tubular flange is formed extending outwardly from the base of the filter and is eccentric to the central axis of the filter and the perforated tube. The flange has a lip protruding inwardly. By pushing the flange over the suction cover, the lip locks the flange in place against the back edge of the suction cover. The eccentricity of the flange allows rotation of the filter to position it as desired with respect to surrounding surfaces.

Another important aspect of the invention concerns attachment of the cover plate to the inner side of a pool or spa wall, extending about a water body, so as to allow safe, easy replacement of the filter unit.

These and other objects and advantages of the invention, as well as the details of an illustrative embodiment, will be more fully understood from the following specification and drawings, in which:

DRAWING DESCRIPTION

FIG. 1 is a plan view of a spa or pool apparatus into which the filter unit and cover plate are integrated;

FIG. 2 is an elevation taken on lines 2—2 of FIG. 1;

FIG. 3 is an enlarged, axially exploded, elevational view of the filter element, cover plate and associated structure, in relation to a pool or spa side wall;

DETAILED DESCRIPTION

Figure 4:
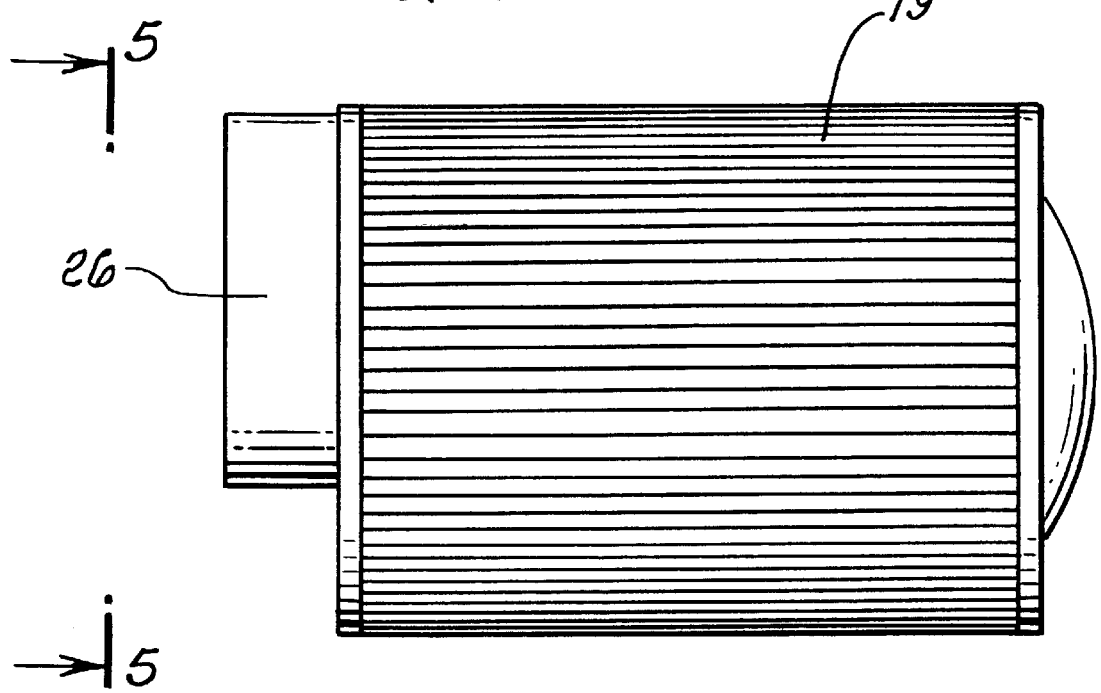
FIG. 4 is a further enlarged elevational view of the filter unit.
Figure 5:
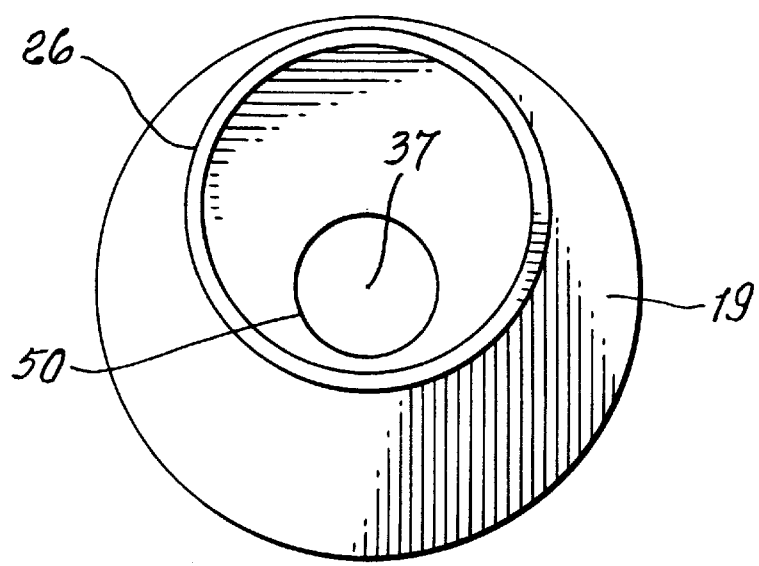
FIG. 5 is an end view taken on lines 5—5 of FIG. 4.

In FIGS. 1 and 2, a pool or spa unit 10 includes an annular upright side wall 11 and a bottom wall 12. The side wall may consist of multiple sections 11a. The top level of water contained by the unit is indicated at 13. The self-supporting side wall may consist of plastic material, as disclosed for example in U.S. Pat. Nos. 5,745,934 and 5,749,107. The side wall is shown to contain ducting at 14 and 15, the upper ducting 14 to supply water under pressure to jets at 14a that supply water to the interior 10a of unit 10. Lower ducting 15 receives water from the body 13a of contained water in the pool or spa, as under suction exerted by a pump indicated at 16. The pump re-supplies water to ducting 14, under pressure.

As seen in FIGS. 2 and 3, suction is exerted via a side opening 17 in side wall 11 to the interior of a filet unit 18, for flowing pool or spa water through the cylindrical, porous filter element 19 of unit 18, via side opening 17 to duct 15.

A perforated, protective, thin-walled, cover plate 20 is provided in registration with an outlet from the end 21 of the filter unit, to pass water from the filter unit interior to the tub body side opening 17. The plate 20 is typically retained to the tub side wall 11; and it provides protection against injection of bather's body parts into side opening 17 under the strong suction forces existent at the side opening.

Figure 7:
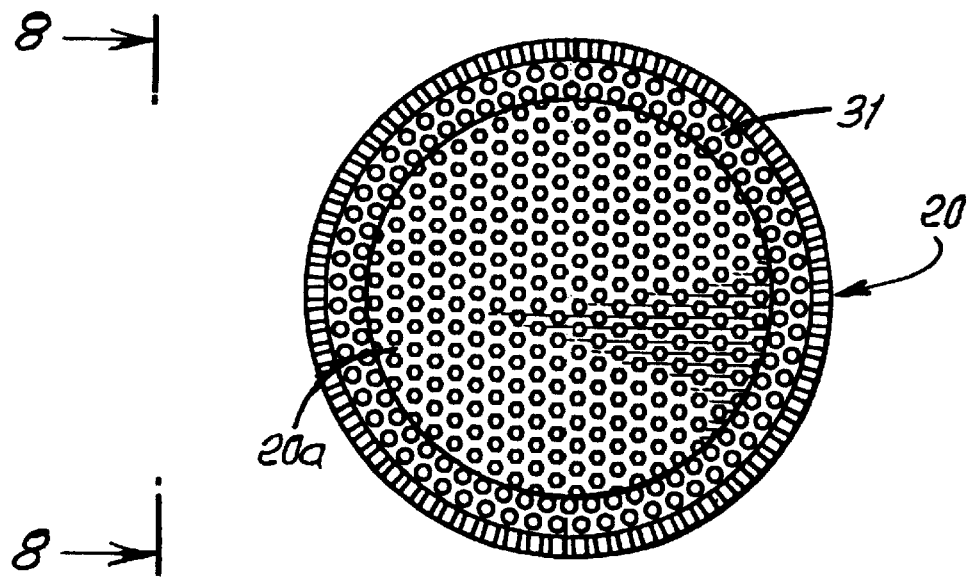
FIG. 7 is an endwise axial view of the cover plate.
Figure 8:
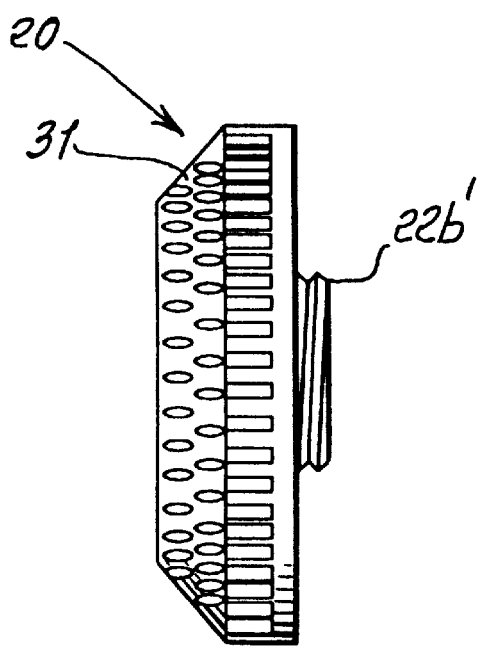
FIG. 8 is an elevation taken on lines 8—8 of FIG. 7.

FIG. 7 shows a typical perforated end wall 20a of the cover plate 20, for passing water from the filter unit to the side wall opening. This plate is shown to have an integral, endwise, open, tubular duct 22 in registration with perforated end wall 21 to receive and pass water to tub wall side opening 17. Duct end 22a typically communicates with a primary plenum chamber 23 formed in the plate between perforated end wall 21, and imperforate annular wall 24 surrounding the duct end 22a, to aid flow to the duct interior from the filter unit interior. Also, duct opposite end 22b is connected to or telescopically received by a tubular wall fitting 44, as better seen in FIG. 3. The duct end 22*b* may be threaded, as seen at 22*b*' in FIG. 8, to threadably connect to fitting 44, locking the cover plate to fitting 44. The latter in turn permanently connects to the tub wall, as via a tubular section 44*a* of the fitting that is fitted into and retained to the wall opening bore.

In accordance with an important aspect of the invention, the filter unit and cover plate are endwise interconnected in such a way as to resist inadvertent disconnection.

Figure 6:
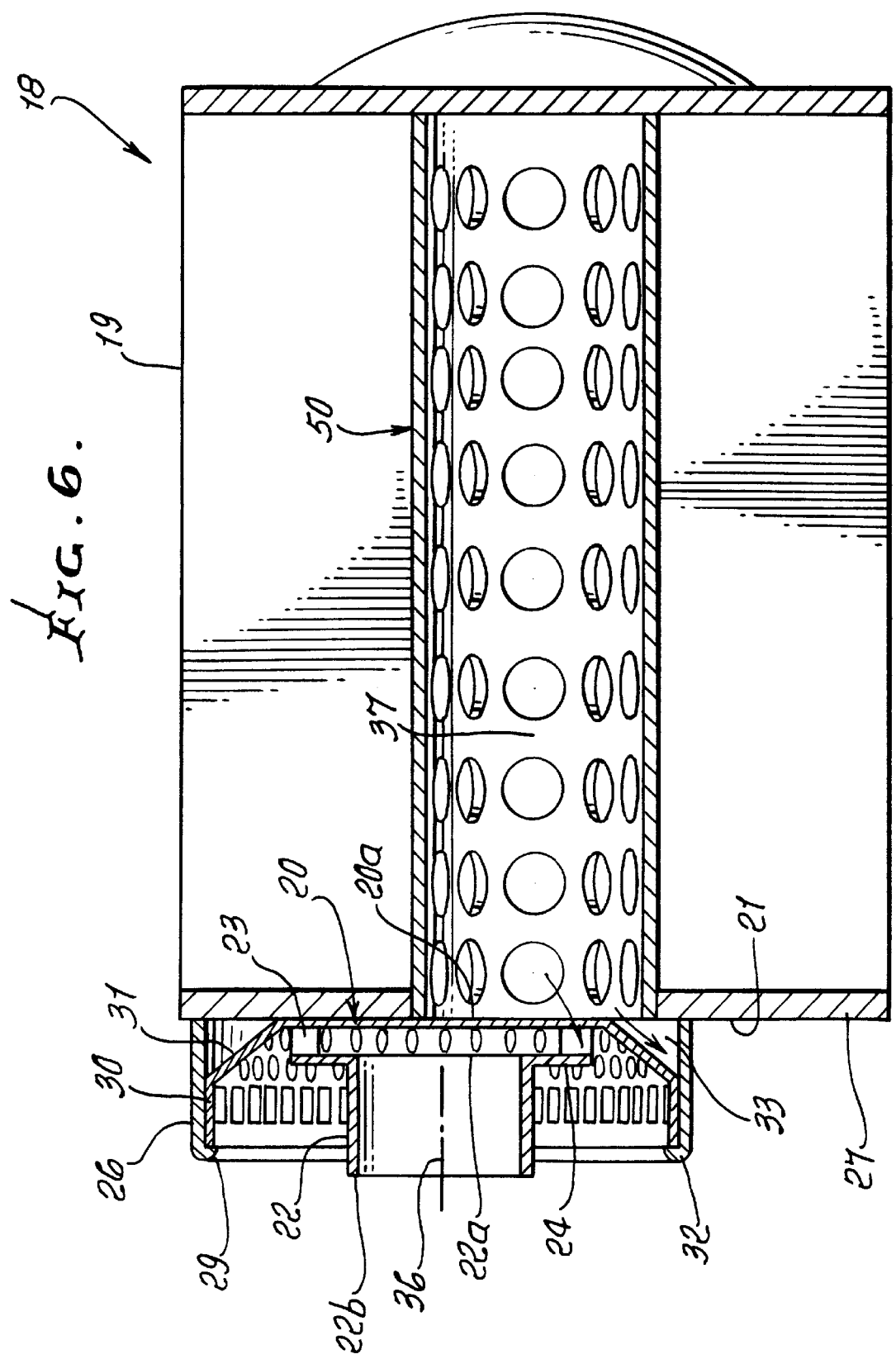
FIG. 6 is an enlarged elevation, taken in section, through a filter unit assembled to a cover plate.

Referring to FIG. 6, showing a preferred embodiment of the connection, an annularly extending flange 26 is integral with the filter unit end wall 27, and projects endwise toward the cover plate in such a way that the plate has detent or snap-connection to the flange.

As shown, the flange 26 has an internal lip 29, which may extend in a circular direction relative to the cover plate annular skirt 30. As the flange 26 is advanced to the left closely over the cover plate, the tapered or conical surface 31 of the plate cams the convex nose end 32 of the flange radially outwardly, placing the flange in radial resilient tension; and ultimately, the lip 29 rides over the end of the plate skirt and drops radially inwardly to the position seen in FIG. 6. At this time, the cover plate end wall 21 comes into face-to-face seating engagement with the filter unit end wall 27, holding the filter unit in firmly supported position relative to the cover plate, which is itself firmly mounted to the tub wall, as referred to above.

Note that a secondary plenum chamber 33 is formed between conical surface 31 of the cover plate, flange 26, and end 27 of the filter unit, and communicates with the primary plenum chamber, via perforations in conical wall 31 of the plate. Note in FIG. 6 that, due to eccentricity of the axes 36 and 37 of the plate and filter unit, some water is supplied from perforated tube 50 in the filter unit to part of the secondary plenum chamber, in addition to water directly supplied to the primary plenum chamber.

Such eccentricity allows for adjustable rotation of the filter unit body about the plate axis 36, to raise or lower the filter unit in the tub interior, as desired, for example to remain submersed even though the level of the water in the tub may be varied. This, of course, enhances efficiency, by "tuning" of the filter location to the desired water level.

In FIG. 3, note tub fitting 44 having a tubular shank 44*a* connectible into bore 70 in the tub wall 11. A gasket 72 seals off between flange 44*b* of fitting 44 and the tub inner wall. The duct 22 of plate 20 telescopically attaches to a bore in fitting 44, as by threading.

Figure 9:
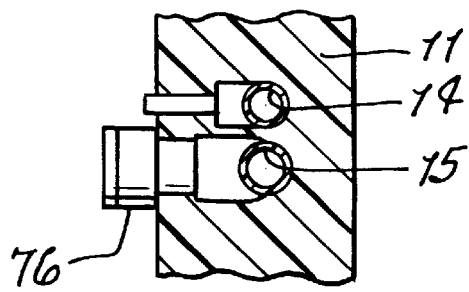
FIG. 9 is a section taken on lines 9—9 of FIG. 1.

FIG. 9 shows a water jet unit 76 in the tub wall, and to which water is supplied under pressure.

The invention provides, in combination:
a) a tub having a sidewall to extend asbout a water receiving zone,
b) and a filter unit in said zone and having rotatable connection to support structure at said side wall and about a first axis extending through a duct that passes water between the filter unit and ducting associated with the tub side wall, said axis extending toward said water receiving zone,
c) said filter unit having a body that extends in offset relation to said axis whereby body rotation via said rotatable connection about said axis carries the body to selected elevation within the water receiving zone.

In this regard, the filter unit body is typically generally cylindrical and has an axis offset from the first axis, as for example is described above (see first axis 36 and body axis 37). Also, the filter unit may have snap connection to said support structure (see for example connection elements 26, 32 and 29 that connect to support plate 20 at 30).

I claim:
1. In a pool or spa filter, the combination comprising
   a) a filter unit having porous filter wall means to pass pool or spa water into the filter unit interior, said unit having a suction outlet,
   b) a perforated cover plate in water passing registration with said outlet,
   c) said filter unit and cover plate being endwise interconnected and blocked against endwise inadvertent disconnection,
   d) and including a side wall of said pool or spa having a water passing opening therein, with a tubular element telescopically connected to said cover plate.

2. The combination of claim 1 including an annularly extending flange integral with said filter unit, said plate removably interfitting said flange, endwise.

3. The combination of claim 2 wherein said flange has an inner wall and an internal lip, said plate received against said inner wall and against said internal lip.

4. The combination of claim 3 wherein said flange inner wall is cylindrical, the plate having a cylindrical outer wall fitting radially against said flange inner wall.

5. The combination of claim 3 wherein said plate has a circular extending peripheral portion, and said flange internal lip has a generally circularly extending portion engaging said plate circular peripheral portion.

6. The combination of claim 2 wherein said filter unit has an axis, said flange extends eccentrically relative to said filter unit axis, the filter unit having a non-metallic filtering element extending cylindrically about said first axis.

7. The combination of claim 2 wherein said plate and flange have endwise push-together detent or snap interconnection.

8. The combination of claim 1 wherein said pool or spa wall contains a water body into which said filter unit and cover plate are received.

9. The combination of claim 1 wherein said filter unit includes a perforate tube in said unit interior, to receive and pass filtered water toward said cover plate connected to the filter unit.

10. The combination of claim 1 including fitting means for removably attaching said cover plate to a spa or tub wall.

11. In a pool or spa filter, the combination comprising
    a) a filter unit having porous filter wall means to pass pool or spa water into the filter unit interior, said unit having a suction outlet,
    b) a perforated cover plate in water passing registration with said outlet,
    c) said filter unit and cover plate being endwise interconnected and blocked against endwise inadvertent disconnection,
    d) and wherein said filter unit has a first axis, and said cover plate has a second axis, said second axis located eccentrically relative to said first axis.

12. The combination of claim 11 including an annularly extending flange integral with said filter unit, said plate removably interfitting said flange, endwise, and wherein said annular flange extends concentrically with said second axis.

13. In combination with a perforate cover plate adapted to cover a spa or pool water suction outlet, an improved filter unit comprising:
    a) said filter unit having a filtering porous wall means to pass pool or spa water into the unit interior, said unit having a water-passing outlet, b) there being a flange integral with the filter unit and extending generally annularly about said outlet, c) said flange having detent means thereon assembled with endwise push-on interconnection with said cover plate, d) said detent means including a circularly extending internal lip on said flange retained against peripheral extent of said cover plate, allowing filter unit adjustment relative to the cover plate.

14. For combination with a perforate cover plate adapted to cover a spa or pool water suction outlet, an improved filter unit comprising:

a) said filter unit having a filtering porous wall means to pass pool or spa water into the unit interior, said unit having a water-passing outlet, b) there being a flange integral with the filter unit and extending generally annularly about said outlet, c) said flange having detent means thereon to provide for assembled with endwise push-on interconnection with said cover plate, d) and wherein said unit has an axis, and said flange extends eccentrically relative to said filter unit axis, the filter unit having a non-metallic filtering element extending cylindrically about said first axis.

15. In a pool or spa filter, the combination comprising a) a filter unit having porous filter wall means to pass pool or spa water into the filter unit interior, said unit having a suction outlet, b) a perforated cover plate in water passing registration with said outlet, c) said filter unit and cover plate being endwise interconnected and blocked against endwise inadvertent disconnection, d) and including fitting means for removably attaching said cover plate to a spa or tub wall, e) and including said spa or tub wall having a bore communicating with the tub wall inner side, said fitting means including a tubular element connected into said bore, said cover plate having a tubular duct telescopically connected to said tubular element.

16. In-combination, a) a tub having a sidewall to extend asbout a water receiving zone, b) and a filter unit in said zone and having rotatable connection to support structure at said side wall and about a first axis extending through a duct that passes water between the filter unit and ducting associated with the tub side wall, said axis extending toward said water receiving zone, c) said filter unit having a body that extends in offset relation to said axis whereby body rotation via said rotatable connection about said axis carries the body to selected elevation within the water receiving zone.

17. The combination of claim 16 wherein said filter unit body is generally cylindrical and has an axis offset from said first axis.

18. The combination of claim 16 wherein said filter unit has snap connection to said support structure.

* * * * *